Aug. 24, 1948.       A. J. YOUNG       2,447,888
THERMOMETER
Filed Sept. 7, 1944              2 Sheets-Sheet 1
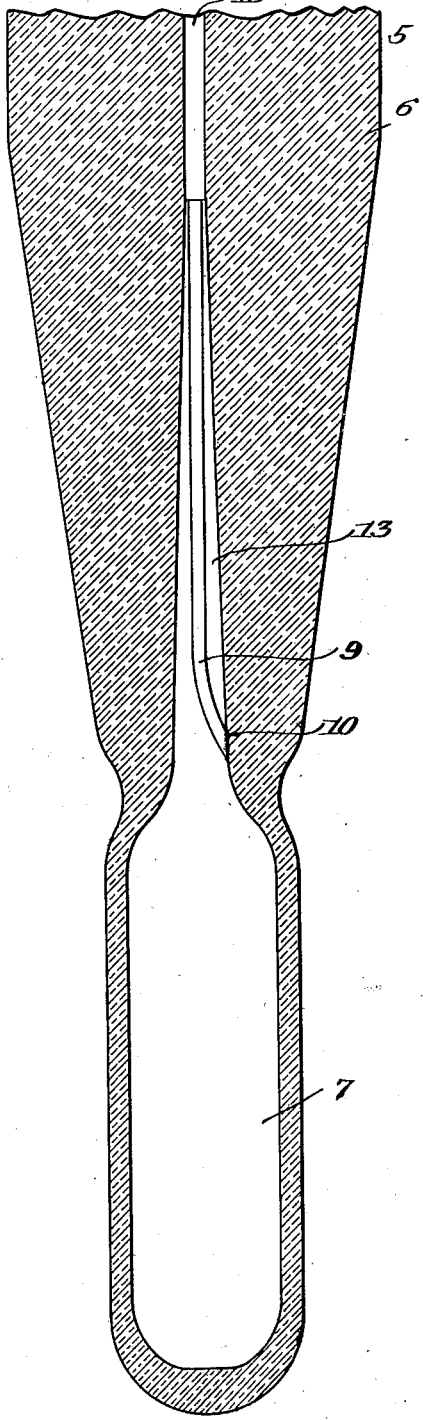
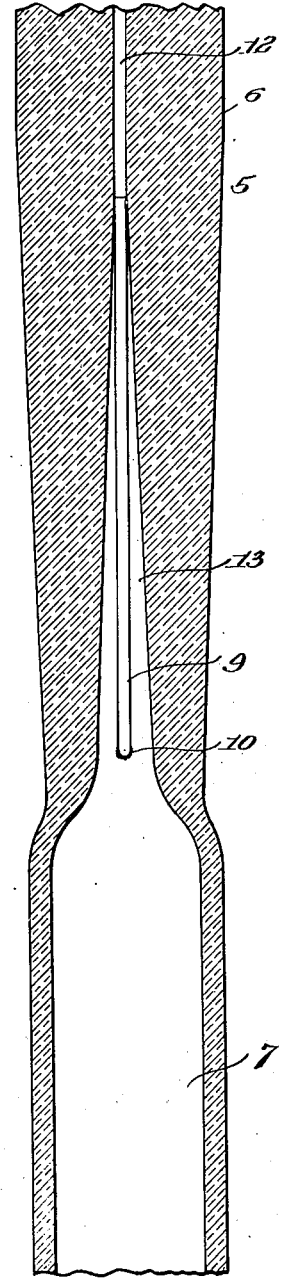
INVENTOR.
A. J. Young
BY D. Clyde Jones
his Attorney Aug. 24, 1948.　　　　A. J. YOUNG　　　　2,447,888
THERMOMETER
Filed Sept. 7, 1944　　　　　　　　2 Sheets-Sheet 2
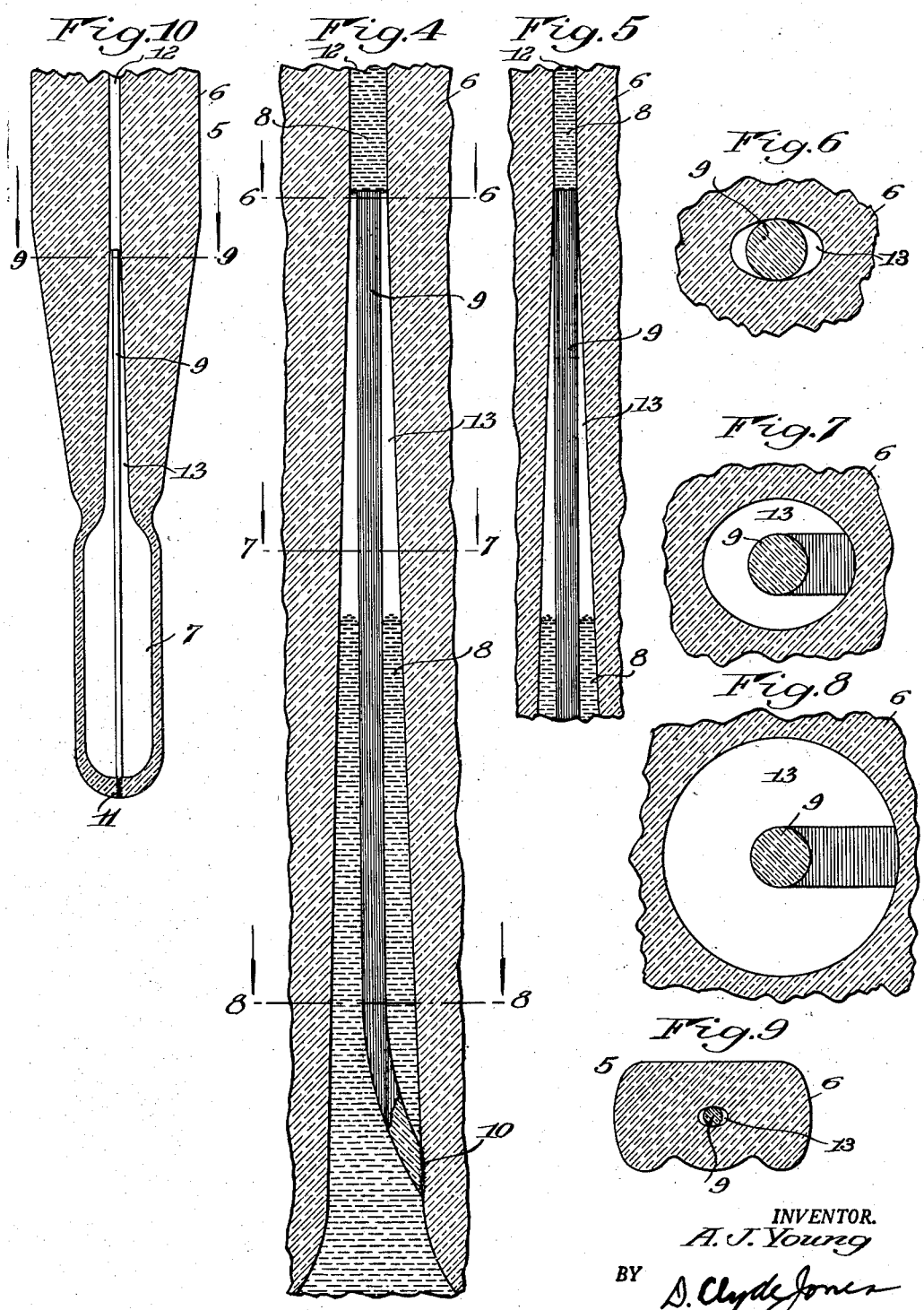
INVENTOR.
A. J. Young
BY D. Clyde Jones
his Attorney Patented Aug. 24, 1948

2,447,888

UNITED STATES PATENT OFFICE 2,447,888

THERMOMETER

Albert J. Young, Rochester, N. Y., assignor to Taylor Instrument Companies, Rochester, N. Y., a corporation of New York Application September 7, 1944, Serial No. 553,077

8 Claims. (Cl. 73—371)

This invention relates to maximum registering thermometers, such as clinical thermometers and the like.

In such registering thermometers, it has been customary in the past to provide a so-called contraction in the passage from the thermometer bulb to the capillary bore in the stem, so that the mercury column remains at its maximum elevation until it is restored by a shake-down operation. Such a contraction requires skillful glass-working technique, since it is usually formed by heating the stem of the thermometer near its junction with the bulb, and while this portion of the glass stem is in a softened state, air is blown into the stem to enlarge the bore at the heated region, until a small chamber results. After the thermometer has become cooled, it is filled with mercury and the upper end of the stem is provided with a large sealed chamber, the formation of which develops a partial vacuum in the tube. While in this condition, the glass at one side of the chamber is heated until it softens so that as a result of the vacuum the softened side of the chamber collapses until it forms a projection extending transversely of the stem to the unheated wall of the chamber. This results in a restricted passage between the bulb and the main bore of the thermometer so that the mercury column tends to separate in the region thereof, leaving a portion of the mercury column at its maximum registering position. The manufacture of the contraction, in the manner just described, requires such skill on the part of the operator that a long period of training is required before this operation can be performed acceptably. In fact, some persons are never able to acquire the necessary skill. Even skilled operators of long experience frequently fail on the first effort to make the contraction of the right dimensions with the result that many of the thermometers when supposedly finished, fail to hold the mercury column in the maximum registering position and have to be repaired. If the contraction leaves too large a passage, the mercury tends to seep back into the bulb resulting in an unsalable thermometer known in the art as a "retreater." On the other hand, if the contraction leaves too small a passage, it will be very difficult to "shake down" the mercury column from its registering position in readiness for subsequent use. These later thermometers are commonly referred to as "hard shakers" and are also unsalable. While the two unsalable types of thermometers can frequently be repaired in one or more attempts by skilled glass workers, the repairing is expensive and slows down production.

It is the purpose of the present invention to provide such a simple construction for a self-registering thermometer that it can be made by any average glass craftsman, and yet the number of rejected thermometers will be small as compared with present results.

In accordance with a main feature of the present invention, there is provided a maximum registering thermometer in which the contraction is not "blown" into the bore of the tube but instead, a separate fiber of glass or the like is inserted into the bore of the tube to extend lengthwise of a portion of the bore in the region of the junction of the stem with the bulb of the thermometer. This glass fiber is anchored within the thermometer preferably in the region of the bore.

In accordance with another feature of the invention, the glass fiber extending into the bore of the tube has a contrasting appearance with respect to the remainder of the glass of the stem, such as by a difference in color so that the fiber also serves as an indicator to assist the reader in locating the mercury column.

Other features and advantages of the invention will appear from the detailed description and claims when taken with the drawings in which Fig. 1 is a front view of a self-registering thermometer made in accordance with the present invention; Figs. 2 and 3 are greatly enlarged longitudinal sections taken along lines at right angles to each other, of the thermometer illustrated in Fig. 1, the mercury being omitted from these illustrations; Figs. 4 and 5 are greatly enlarged fragmentary sections of the portion of the thermometer illustrated in Figs. 2 and 3, showing especially the restricting fiber and its relation to the true bore and the connecting bore of the thermometer, and also showing the normal position of mercury or other indicating liquid in the bore of the thermometer; Figs. 6, 7 and 8 are transverse sections taken respectively on the lines 6—6, 7—7, 8—8 of Fig. 4; and Fig. 9 is an enlarged cross section of the thermometer of Fig. 10, although this section is on a greatly reduced scale with respect to Figs. 6 to 8, inclusive; Fig. 10 is a longitudinal section of a modified form of the invention, the mercury being omitted from the bulb and the bore of the thermometer.

In the drawings, the numeral 5 generally designates a self-registering thermometer of which the clinical thermometer is one type. This thermometer comprises a stem 6 having a bore communicating with a bulb 7, which bulb and part of the bore of the stem contains mercury 8, or other indicating liquid possessing the essential characteristics of mercury. In such a self-registering thermometer, it is essential that the indicating liquid column remain at its most elevated position during any given period of its operation. In order to obtain this registering effect, it is customary to shape the bore of the thermometer in the region of the bulb to provide a contraction which causes the mercury column to be broken after this column has reached its maximum elevated position.

In accordance with the present invention there is provided a registering thermometer wherein the usual blown contraction of the bore is omitted and instead, the desired registering effect is obtained by the use of a fiber 9 made of glass or the like, which fiber extends longitudinally of a portion of the bore and is anchored within the thermometer. As shown in Figs. 2, 3 and 4, the fiber is preferably anchored at a point 10 in the region of the junction of the stem with the bulb of the thermometer. It is preferred to make the fiber of contrasting appearance with respect to the remainder of the thermometer, in order that the fiber will also help in locating the indicating column. While in the preferred form of the invention the fiber is anchored at the mentioned point 10, it may be anchored at point 11 in the bottom of the bulb, the anchoring of the fiber to the bulb being effected when this bulb is sealed off during the course of manufacture.

The thermometer shown in Figs. 1 and 9 is preferably of the type disclosed in the patent to Young No. 2,179,773 and commonly sold under the trade-mark "Binoc." However, this invention is also applicable to any registering thermometer whether it be of the ordinary lens front type or whether it be circular in cross section.

It is preferred to have the thermometer bore of elliptical cross-section with its smaller axis extending in the direction of the observer although, of course, the bore may be of any non-circular cross section. In the invention as illustrated, the bore proper just referred to, is indicated at 12 and communicates with a connecting bore 13 which, in turn, communicates with the bulb 7. The connecting bore tapers very gradually from the true bore 12, to the bulb 7 or, in other words, the connecting bore gradually changes from the elliptical bore as shown in Fig. 6 to the bore of circular cross section shown in Fig. 8. The fiber 9 extends approximately to the junction of the connecting bore 13 to the true bore 12 and may be fused to the wall of the bore at that point. While, of course, the length of the connecting bore may be varied within wide limits, it has been found desirable to have this length from fifty to two hundred and fifty times the smaller axis of the bore. As indicated in Figs. 1, 4 and 5, the fiber is of red color, although the fiber may be of any contrasting appearance with respect to the rest of the thermometer to assist in locating the indicating column.

This disclosure is given merely by way of example, since there can be many modifications in the construction of the present invention without departing from the spirit of the invention.

I claim:

1. In a registering thermometer, a bulb joined to a stem provided with a capillary bore, said bulb communicating with said bore, a thermosensitive liquid such as mercury contained in said bulb, and a fiber of substantially uniform cross section within the bore and anchored to a wall of the bore adjacent the bulb, said fiber having a cross sectional area slightly smaller than the cross sectional area of said bore whereby said fiber serves as a construction to break the liquid column and thereby hold it in its maximum registering position.

2. In a registering thermometer, a bulb joined to a stem provided with a capillary bore elliptical in cross section, said bulb communicating with said bore, a thermosensitive liquid such as mercury contained in said bulb, and a fiber of generally circular cross section anchored in said bore, said fiber having a diameter approximately equal to the minor axis of said bore whereby said fiber serves as a constriction to break the liquid column and thereby hold it in its maximum registering position.

3. In a registering thermometer, a bulb joined to a stem provided with a capillary bore, said bulb communicating with said bore, a thermosensitive liquid such as mercury contained in said bulb, and a colored fiber anchored in said bore, said fiber being relatively short as compared with the length of the bore and having a cross section slightly smaller than the cross section of said bore whereby said fiber serves as a constriction to break the liquid column and thereby hold it in its maximum registering position.

4. In a registering thermometer, a bulb joined to a stem provided with a capillary bore, said bulb communicating with said bore, said bore comprising an indicating portion of uniform cross section throughout its length and a connecting portion of gradually enlarging cross section from its junction with said indicating portion to its opening into said bulb, a thermosensitive liquid such as mercury contained in said bulb, and a fiber mounted in said connecting bore portion and extending approximately to said junction, said fiber having a cross section slightly smaller than the cross section of said bore whereby said fiber serves as a constriction to break the liquid column and thereby hold it in its maximum registering position.

5. In a registering thermometer, a bulb joined to a stem provided with a capillary bore, said bulb communicating with said bore, said bore comprising an indicating portion of uniform elliptical cross section throughout its length and a connecting portion of gradually enlarging and changing outline of cross section from its junction with said indicating portion to its circular opening into said bulb, a thermosensitive liquid such as mercury contained in said bulb, and a fiber mounted in said connecting bore portion and extending approximately to said junction, said fiber having a cross section slightly smaller than the cross section of said bore whereby said fiber serves as a constriction to break the liquid column and thereby hold it in its maximum registering position.

6. In a registering thermometer, a bulb joined to a stem provided with a capillary bore, said bulb communicating with said bore, a thermosensitive liquid such as mercury contained in said bulb, and an elongated imperforate constricting element of uniform cross section within the bore having its long axis directed longitudinally thereof and spaced from one side thereof, said element being relatively short as compared to the length of the stem and being anchored against the wall of the bore whereby said element serves as a constriction to break the liquid column and thereby hold it in its maximum registering position.

7. In a registering thermometer, a bulb joined to a stem provided with a capillary bore, said bulb communicating with said bore, a thermosensitive liquid such as mercury contained in said bulb, and an elongated imperforate constricting element of uniform cross section within the bore having its long axis directed longitudinally thereof and spaced from one side thereof, said element being relatively short as compared to the length of the stem and being fused to the wall of the bore whereby said element serves as a constriction to break the liquid column and thereby hold it in its maximum registering position.

8. In a registering thermometer, a bulb joined to a stem provided with a capillary bore, said bulb communicating with said bore, a thermosensitive liquid such as mercury contained in said bulb, and a discrete imperforate element of substantially uniform cross section inserted longitudinally in said bore and fusibly joined to a wall thereof, said element being of somewhat smaller cross section than that of said bore whereby said element serves as a constriction to break the liquid column and thereby hold it in its maximum registering position.

ALBERT J. YOUNG.

REFERENCES CITED

The following references are of record in the file of this patent:

UNITED STATES PATENTS

| Number | Name | Date |
|---|---|---|
| 460,013 | Hicks et al. | Sept. 22, 1891 |
| 613,190 | Cossor | Oct. 25, 1898 |
| 1,199,121 | Siebert | Sept. 26, 1916 |

FOREIGN PATENTS

| Number | Country | Date |
|---|---|---|
| 16,549 | Great Britain | Aug. 15, 1905 |
| 281,878 | Germany | Feb. 4, 1915 |
| 466,474 | Germany | Oct. 5, 1928 |
| 478,290 | Germany | June 26, 1929 |